United States Patent
Fujimoto et al.

(12) 
(10) Patent No.: US 6,771,574 B2
(45) Date of Patent: Aug. 3, 2004

(54) DISK DEVICE, READ CONTROL METHOD FOR MANAGEMENT INFORMATION IN DISK DEVICE, AND DATA PROCESSING TERMINAL DEVICE USING THAT DISK DEVICE

(75) Inventors: Masahiro Fujimoto, Yokohama (JP); Kouji Minabe, Hitachiota (JP); Hideo Nishijima, Hitachinaka (JP); Kazunori Uemura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 10/305,718

(22) Filed: Nov. 27, 2002

(65) Prior Publication Data

US 2003/0151992 A1 Aug. 14, 2003

(30) Foreign Application Priority Data

Feb. 8, 2002 (JP) ....................................... 2002-032749

(51) Int. Cl.[7] ................................................ G11G 7/00
(52) U.S. Cl. ................ 369/47.1; 369/47.11; 369/53.45; 369/59.1
(58) Field of Search ............................. 369/47.1, 47.11, 369/47.14, 47.15, 47.28, 47.36, 47.55, 53.1, 53.11, 53.31, 53.45, 59.1, 59.14, 59.25

(56) References Cited

U.S. PATENT DOCUMENTS 5,548,784 A * 8/1996 Easley, Jr. et al. ........ 369/53.41
6,115,331 A * 9/2000 Inoue et al. .............. 369/30.34
6,515,949 B2 * 2/2003 Masaki et al. ........... 369/53.11

FOREIGN PATENT DOCUMENTS

JP 10-269709 10/1998
JP 11-025575 1/1999

* cited by examiner

Primary Examiner—Muhammad Edun
(74) Attorney, Agent, or Firm—Townsend and Townsend and Crew LLP

(57) ABSTRACT

In a disk device, when processing is resumed after replacing the disk or cutting off the power supply, in order to acquire disk-related information in a short period of time and reduce the start-up time, the effectiveness of management information recorded on the disk is judged, the finding of the judgment is stored into a memory means capable of storing even when power supply is off, the management information is read out of some of the recording areas of the disk in advance of a recording or reproducing operation if the stored information on the finding of the judgment indicates effectiveness for the inserted disk.

22 Claims, 9 Drawing Sheets

DISK DEVICE, READ CONTROL METHOD FOR MANAGEMENT INFORMATION IN DISK DEVICE, AND DATA PROCESSING TERMINAL DEVICE USING THAT DISK DEVICE

BACKGROUND OF THE INVENTION

1. Technical Field of the Invention

The present invention relates to a technique for reading disk management information in a disk device.

2. Description of the Related Art

In read-only disks, such as CDs or ROMs, or recording medium, such as optical disks, mainly intended for recording audiovisual information, there is no area for, defect management made available in advance, and the processing method against any defect in the medium is determined on the system side as required. Unlike them, optical disks, such as DVD-RAMs, for which emphasis is placed on securing reliability at or above a certain level by standardizing the defect processing method, and erasable type disks, such as magnetic disks, are checked for defects sector by sector or on some other prescribed basis at the time of manufacture and supplied to the market in a state in which the addresses of sectors or other units containing the detected defects are recorded in a prescribed area. How to record management information on these defects is determined in a protocol governing the pertinent type of disk. An erasable disk conforming to the ISO/IEC 10089.13549 protocol, for instance, has defect management information consisting of defective sectors and substitute sectors therefor in two areas each at the inner and outer ends of the user area in the disk. Namely the disk holds altogether four sets of the same management information on the inner and outer circumferences. These areas are known as defect management areas (DMAs). In the following description, the defect management information mentioned above will be referred to as first management information. The aforementioned erasable disk conforming to the ISO/IEC 10089.13549 protocol also has two sets of file management information known as the universal disk format (UDF) at the inner and outer ends of the user area. In the following description, the aforementioned UDF will be referred to as second management information. In a conventional optical disk device for recording or reproducing information onto or out of this disk, when turning on power supply to the device and when inserting the disk, all the second management information recorded in the two areas at the inner and outer ends of the user area is read in after reading in all the first management information recorded in the two areas at the inner and outer ends. The reason why the same sets of information are recorded into a plurality of areas apart from each other is that in this way the reliability of the records themselves can be increased and the reproducibility of the management information can be enhanced against impediments (including fingerprints, dust and flaws) that may arise after the information is recorded.

When all the first management information and the second management information are read by the method described above into the erasable disk provided with medium management information areas on its inner and outer circumferences, the optical head should make at least one round trip between the inner and outer circumferences of the disk, resulting in a long time taken before the recording or reproduction of information can be started. This problem is especially conspicuous with optical disk devices in which the head travels more slowly than the magnetic head. Examples of related art are found in, for instance, in the Japanese Patent Applications Laid-open Nos. 11-25575 and 10-269709. The Japanese Patent Application Laid-open No. 11-25575 discloses a technique by which, when the device finds the medium to be erasable after power supply is turned on or the medium is inserted, it reads out DMA information on the inner circumference, then records and reproduces a pattern in a drive test zone on the inner circumference to adjust recording power, moves the pickup to another drive test zone on the outer circumference to adjust recording power similarly, and processes start-up by reading out DMA information on the outer circumference. The Japanese Patent Application Laid-open No. 10-269709 describes a technique by which, in a magnetic disk device using an inerasable magnetic disk, information on the assignment of substitutes for defective portions and information on associations between defective portions and substitutes are stored into an erasable non-volatile memory to reduce the time taken to access data and to eliminate the exhaustion of the backup battery. When an instruction is received from a superior device to read in or write in a range containing defective portions, the data and management information of the aforementioned sectors are read out of written into the non-volatile memory.

On the other hand a mobile video camera or the like, which is often required to record a contingent event in a hurry, keenly needs a reduction in the length of time taken to start up. This necessitates a further cutback on the processing time of management information and the like. To meet this requirement, a conventional disk device reads first management information (medium management information) on an optical disk when the optical disk is inserted, stores the information into a D-RAM or the like, and holds the first management information in the D-RAM or the like as long as the main power is on before the optical disk is ejected. In this manner, even if the disk revolution is stopped in the power saving mode when no demand for recording or reproduction comes for a long period of time, recording or reproduction, when it is resumed, can be done using the held first management information without having to read the first management information on the disk. However, once the main power is turned off, the management information stored in the D-RAM or the like is lost.

However, by the above-described technique of storing the first management information (medium management information) into a D-RAM or the like, the first management information can be held only while the main power is on, and once the main power is turned off, the previously held first management information is lost. Therefore, if the main power is once turned off and again turned onto perform recording or reproduction, even if the disk is neither inserted nor ejected, it is necessary to take time and read the prescribed management from the outset. On the other hand, the technique disclosed in the Japanese Patent Application Laid-open No. 10-269709 takes no account of disk insertion or ejection, and accordingly cannot be applied to a disk device for which the disk is replaced. Moreover, as the technique disclosed in this application performs erasion using a non-volatile memory which permits erasion only a relatively small number of times, the memory may become unusable soon.

Or if a battery-drivable CMOS memory or the like is used instead of a non-volatile memory to store information on the replacement of defect-containing sectors in a disk and data to be stored there, a capacity of about 10 MB is likely to be required, and this would necessitate a large-capacity battery for driving the memory, making it difficult to reduce the size and cost of the device. The technique described in the cited patent application also involves an unsolved problem that, when processing is to be resumed after the replacement of the disk or temporary suspension, the time take to acquire and process management information should be reduced to shorten the start-up time.

According to the prior art, for instance, if a disk is already in the device when the main power is turned on but there is not management information or the like regarding the disk, it will be necessary to take out of the management information necessary for recording or reproduction by reading the prescribed full course of reading management information. However, if there is already management information or the like regarding the disk already acquired by the disk device and the acquired information is reliable, that acquired information can be used. If the acquired information is unreliable, management information and the like on the disk should be read and confirmed at least one. In other words, the disk device should acquire device-related information which would serve as the basis of reliability. The required disk-related information includes: (1) is the inserted disk identified? (2) if identified, has the device acquired necessary management information regarding the identified disk? and (3) is the acquired management information reliable enough? Since the memories of the control system and others are operating in a state in which the main power is kept turned on, there will be no problem because information from (1) through (3) above is wholly held. However, if the main power is once cut off and again turned on, it will be necessary to check in a short period of time when the power is turned on again whether or not the disk that is currently in the device is the same as what was in when the main power was cut off, whether information regarding the disk that was in the device is held and, if it is, whether that information is reliable.

A problem to be solved by the present invention, in view of the status of the prior art described above, is to enable a disk device, even when processing is resumed after replacing the disk or cutting off the power supply, to reduce the start-up time by acquiring reliable information on the disk that is inserted in a short period of time, and thereby make it possible to start recording or reproduction quickly after the power supply is turned on.

SUMMARY OF THE INVENTION

An object of the invention is to provide a technique that can solve the problem noted above.

In order to solve the problem, according to the invention basically, in a disk device the effectiveness of management information recorded on a disk is judged; the finding of the judgment is stored into a memory means capable of keeping its content stored even when power supply is off; and when power supply is turned on, the management information is read out of some of a plurality of recording areas of the disk in advance of a recording or reproducing operation if the stored information on the finding of the judgment indicates effectiveness for the inserted disk. Also, in a disk device, disk insertion and ejection are detected or monitored; the finding of the detection of insertion or ejection is stored into a memory means capable of keeping its content stored even when power supply is off; and when power supply is turned on, effective management information is read out of some of a plurality of recording areas of the disk if disk insertion or ejection is detected from the stored information on the finding of the detection of insertion or ejection. Or in a disk device, the effectiveness of management information regarding disks is judged with respect to management information in some of the recording areas; the finding of the judgment is stored into a memory means capable of keeping its content stored even when power supply is off; and when power supply is turned on, the management information in that recording area judged to be effective is read if the stored information on the finding of the judgment indicates effectiveness for the inserted disk; and a recording or reproducing operation is started. More specifically, in a disk device, (1) the configuration is such that there are provided a judging means for judging the effectiveness of management information on a disk in recording or reproducing signals; a memory means capable of keeping its content stored even when power supply is off; and a control means for selecting the mode of reading the management information from the disk on the basis of information on the finding of the judgment, wherein the management information is read out of some of a plurality of recording areas of the disk in advance of a recording or reproducing operation if the stored information on the finding of the judgment indicates effectiveness for the inserted disk when power supply is turned on; (2) the configuration is such that there are provided a detecting means for detecting the presence or absence of a fitted disk; a judging means for judging the effectiveness of management information in recording or reproduction; a memory means capable of storing the finding of the judgment even when power supply is off; and a control means for selecting the mode of reading the management information from the disk on the basis of information on the finding of the judgment, wherein the management information is read out of some of a plurality of recording areas of the disk in advance of a recording or reproducing operation if the presence of a fitted disk is detected and the stored information on the stored finding of the judgment indicates effectiveness for the inserted disk when power supply is turned on; (3) the configuration is such that there are provided an insertion/ejection detecting means for detecting disk insertion and ejection; a memory means capable of storing the result of the detection of insertion or ejection even when power supply is off, and a control means for selecting the mode of reading the management information on the basis of the stored information on the result of the detection of insertion or ejection, wherein the management information is read out of some of the recording areas of the disk in advance of a recording or reproducing operation if neither insertion nor ejection of the disk is detected; (4) the configuration is such that there are provided a detecting means for detecting whether or not a disk is fitted, a judging means for judging the effectiveness of the management information for the disk in recording or reproduction, an insertion/ejection detecting means for detecting insertion or ejection of the disk, a memory means capable of storing the result of the detection of insertion or ejection and the finding of the judgment even when power supply is off, and a control means for selecting the mode of reading the management information on the basis of the stored information on the result of the detection of insertion or ejection and the finding of the judgment, wherein the management information is read out of some of the recording areas of the disk in advance of a recording or reproducing operation if the fitting of the disk is detected, the stored finding of the judgment indicates effectiveness for the inserted disk and neither insertion nor ejection of the disk is detected when power supply is turned on; (5) in the configuration of (4) above, the detecting means, the judging means and the control means operate on a first power source, the insertion/ejection detecting means and the memory means operate on a second power source and, when the first power source is turned on, selection regarding the mode of reading the management information is performed; (6) the configuration is such that there are provided a detecting means for detecting whether or not the disk is fitted, a judging means for judging the effectiveness of the management information in recording or reproduction with respect to management information recorded over a plurality of recording areas of the disk, a memory means capable of storing the finding of the judgment even when power supply is off, and a control means for selecting the mode of reading the management information from the disk on the basis of the stored information on the finding of the judgment, wherein, if the fitting of the disk is detected and the stored information on the finding of the judgment indicates effectiveness for the inserted disk when power supply is turned on, the management information is read out of that area indicated to be effective and a recording or reproducing operation is started; (7) the configuration is such that there are provided a detecting means, operating on a first power source, for detecting whether or not the disk is fitted; a judging means, operating on the first power source, for judging the effectiveness of the management information in the recording or reproduction; a memory means, operating on a second power source, for storing the finding of the judgment; and a control means, operating on the first power source, for selecting the mode of reading the management information on the basis of the stored information on the finding of the judgment, wherein, when the first power source is turned on, if the fitting of the disk is detected and the stored information on the finding of the judgment indicates effectiveness for the inserted disk, effective management information is read out of either a first area or a second area of the disk or, if it indicates ineffectiveness, the management information is read out of both the first area and the second area; (8) the configuration is such that there are provided a detecting means for detecting whether or not a disk is fitted, an insertion/ejection detecting means for detecting insertion or ejection of the disk, a memory means capable of storing the result of the detection of insertion or ejection even when power supply is off, and a control means for selecting the mode of reading the management information on the basis of the stored information on the result of the detection of insertion or ejection, wherein effective management information is read out of some of a plurality of recording areas of the disk if the fitting of the disk is detected and neither insertion nor ejection of the disk is detected when power supply is turned on; (9) in the configuration of any of (1) through (8) above, the plurality of areas in which management information is recorded are divided between the inner circumferential part and the outer circumferential part of the disk; (10) in the configuration of any of (1) through (8) above, the plurality of areas in which management information is recorded are four areas, and control is so effected that management information be read from one of these areas; (11) in the configuration of any of (1) through (8) above, the management information consists of a first set of management information for managing the state of the disk itself and a second set of management information for managing data information recorded on the disk for eventual reproduction, and the first and second sets of management information are recorded on a distributed basis in the inner circumferential area and the outer circumferential area of the disk, and control is so effected that the first and second sets of management information be read out of either of these areas; (12) the configuration is such that there are provided a recording means for recording the management information in first and second areas of the disk; a judging means for judging the effectiveness of the management information, a memory means capable of storing the finding of the judgment even when power supply is off, and a control means for selecting the mode of reading the management information from the disk on the basis of the stored information on the finding of the judgment, wherein the management information is read out of either of the first and second areas in advance of recording or reproducing the signals if the stored information on the finding of the judgment indicates effectiveness for the inserted disk or, if it indicates ineffectiveness of the management information, the management information is read out of both the first and the second areas; and (13) in the configuration of any of (1) through (8) above, the recorded or reproduced signals are information signals from a camera image pickup device. Further as an information processing terminal device, (14) the configuration is such that there are provided an interface for information transmission, an information processing means for processing information, a disk device for recording and/or reproducing the processed information onto or out of a disk on which management information of the same contents is multiply recorded over a plurality of areas, and a display means, wherein the disk device comprises a judging means for judging the effectiveness of the management information in recording or reproducing the signals, a memory means capable of storing the result of the judgment even when power supply is off, and a control means for reading management information out of some of the recording areas of the disk in advance of the recording or reproducing operation if the stored information on the finding of the judgment indicates effectiveness for the inserted disk. (15) The configuration may as well be such that there are provided an interface for information transmission, an information processing means for processing information, a disk device for recording and/or reproducing the processed information onto or out of a disk on which management information of the same contents is multiply recorded over a plurality of areas, and a display means, wherein the disk device comprises an insertion/ejection detecting means for detecting insertion or ejection of the disk, a memory means capable of storing the result of the detection of insertion or ejection of the disk even when power supply is off, and a control means for reading effective management information out of some of the recording areas of the disk if neither insertion nor ejection of the disk is detected. Further as a method of controlling the reading of management information in a disk device, (16) the reading of the management information is controlled through a step of reading the management information in advance of recording or reproducing the signals, a step of judging the effectiveness of the read management information, a step of storing the finding of the judgment into a memory means capable of storing even when power supply is off, a step of determining whether or not the stored information of the finding of the judgment indicates effectiveness for the inserted disk, and a step of reading management information out of some of the recording areas of the disk if the stored information on the result of the determination indicates effectiveness for the inserted disk. (17) The reading of the management information is controlled through a step of detecting insertion or ejection of a disk, a step of storing the result of detection into a memory means capable of storing even when power supply is off, and a step of reading effective management information out of some of the recording areas of the disk if the stored information on the result of the detection of insertion or ejection indicates neither insertion nor ejection of the disk.

The control means, when the main power is turned on, selects a short-time for the reading of management information on the basis of the result of detection of disk insertion or ejection or the result of the determination of the effectiveness of the management information for the disk, and thereby reduces the length of time required for start-up.

DETAILED DESCRIPTION OF THE PREFERRED EMBODIMENTS

Preferred embodiments of the present invention will be described below with reference to the accompanying drawings.

Figure 1:
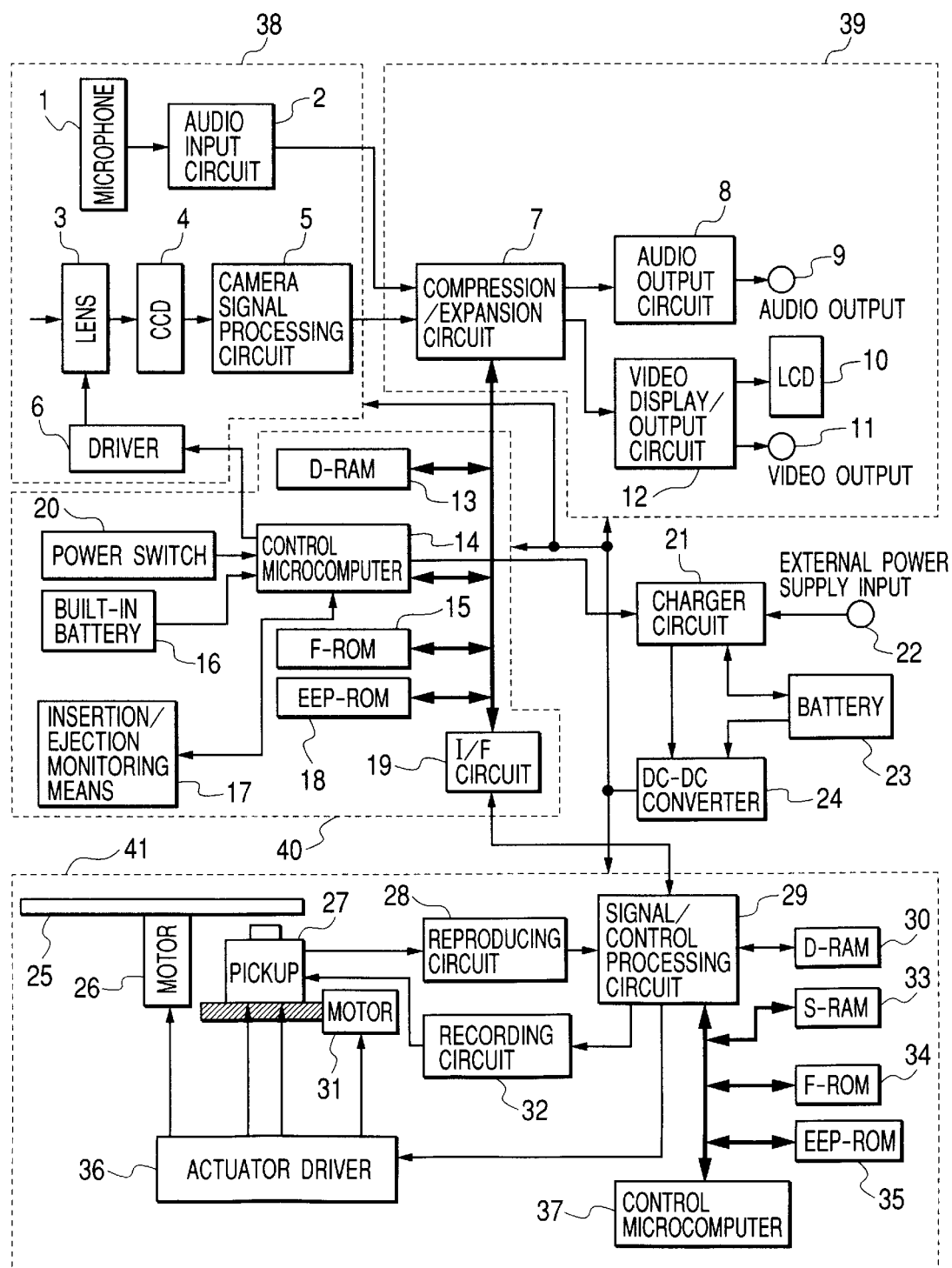
FIG. 1 illustrates a first preferred embodiment of the present invention.
Figure 2:
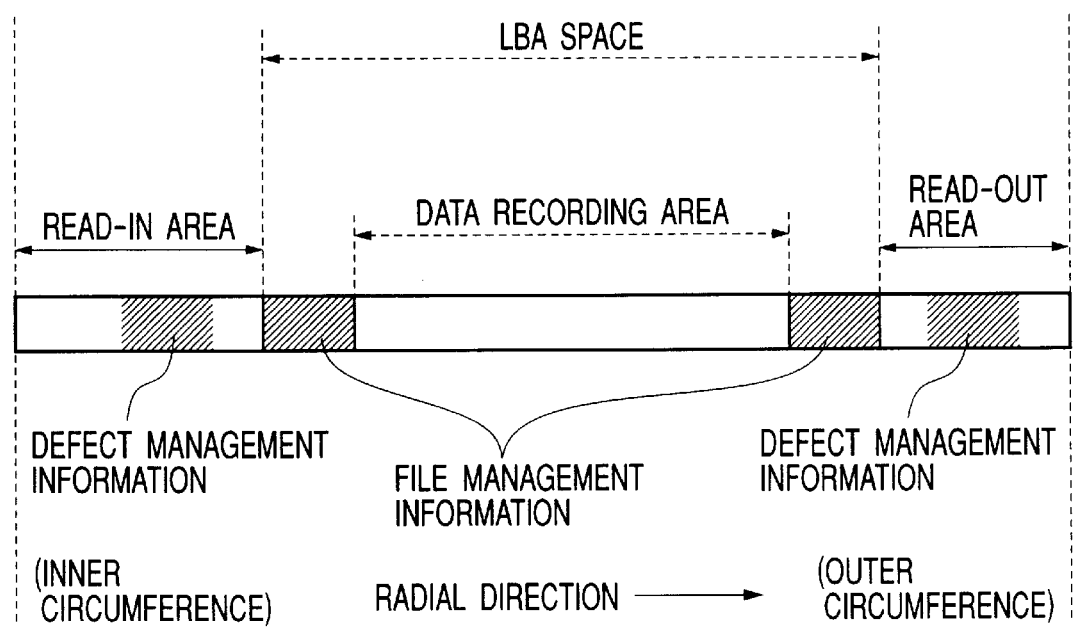
FIG. 2 illustrates the data structure of management information on a disk for use with the device shown in FIG. 1.
Figure 3:
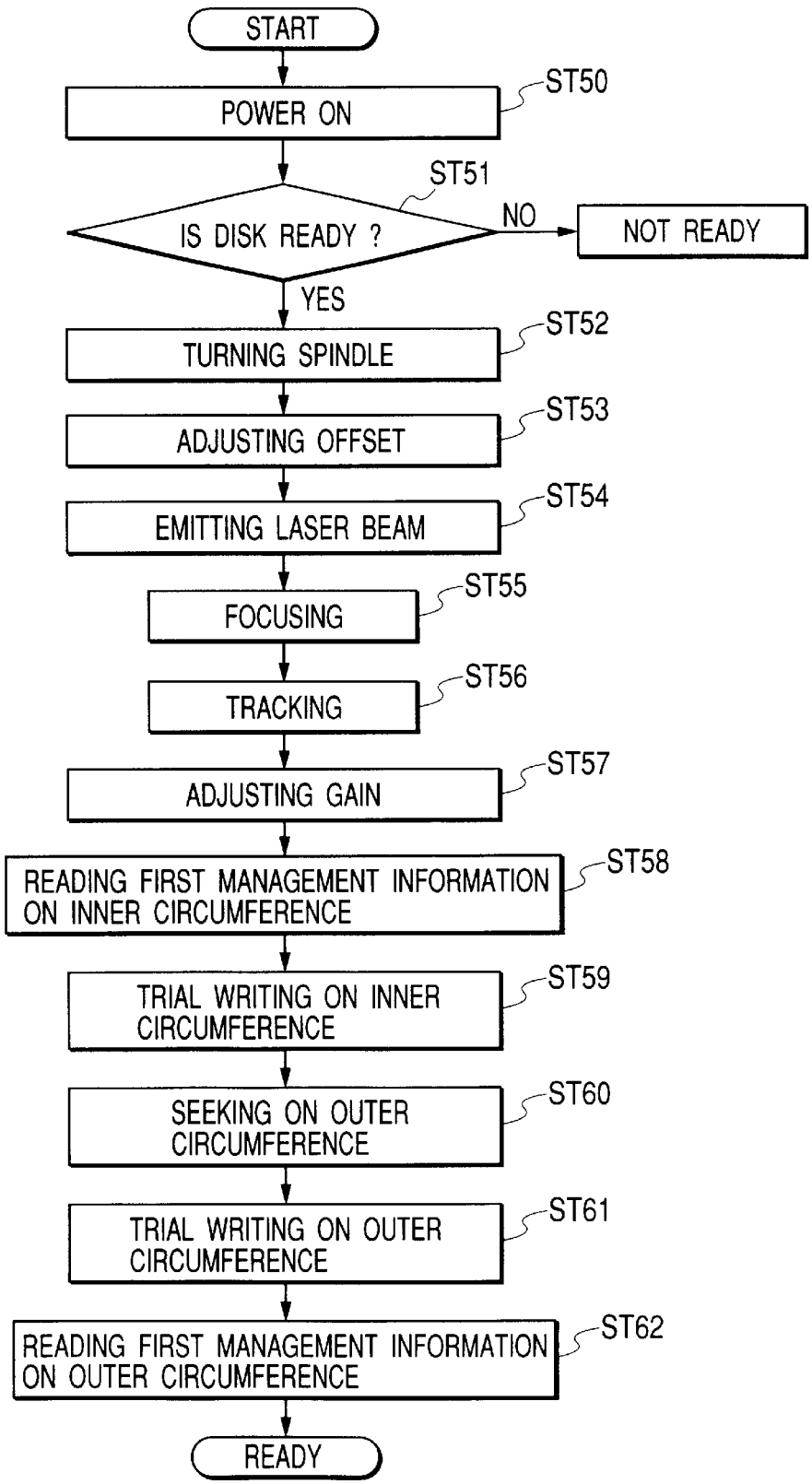
FIG. 3 shows an example of procedure until the start of recording or reproduction by the device shown in FIG. 1.
Figure 4:
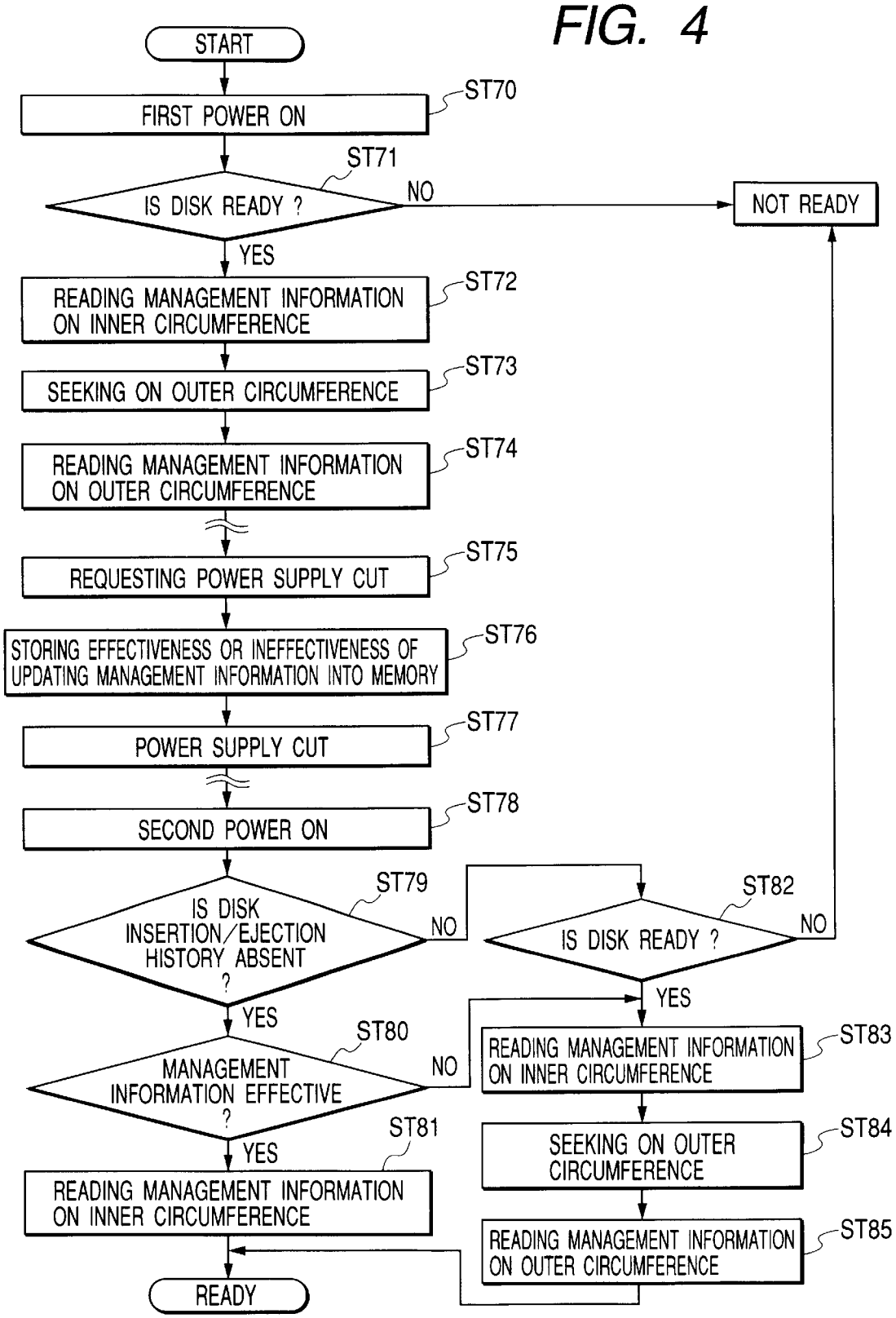
FIG. 4 shows an example of procedure of control of reading management information by the device shown in FIG. 1.
Figure 5:
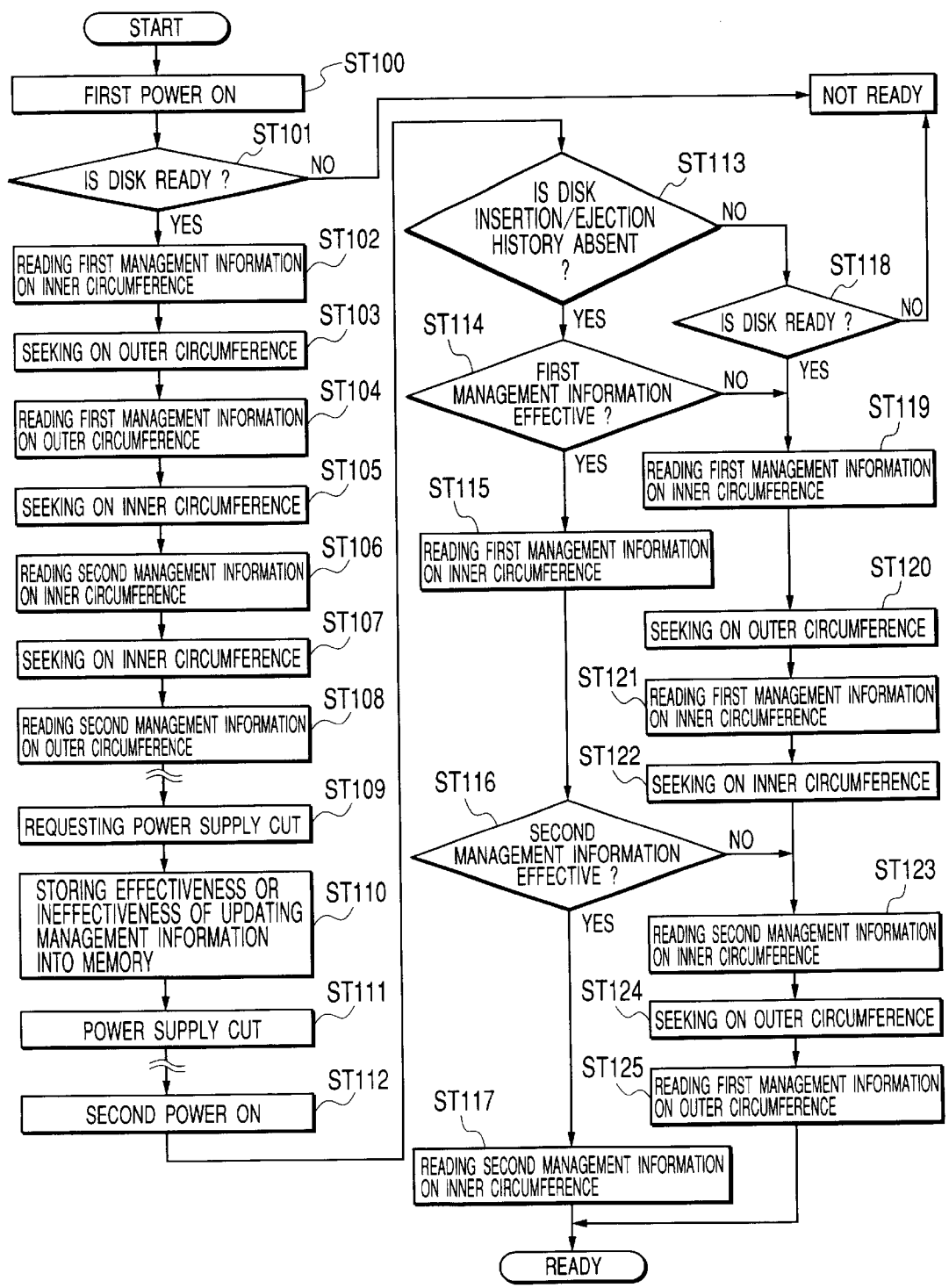
FIG. 5 shows another example of procedure of control of reading management information by the device shown in FIG. 1.
Figure 6:
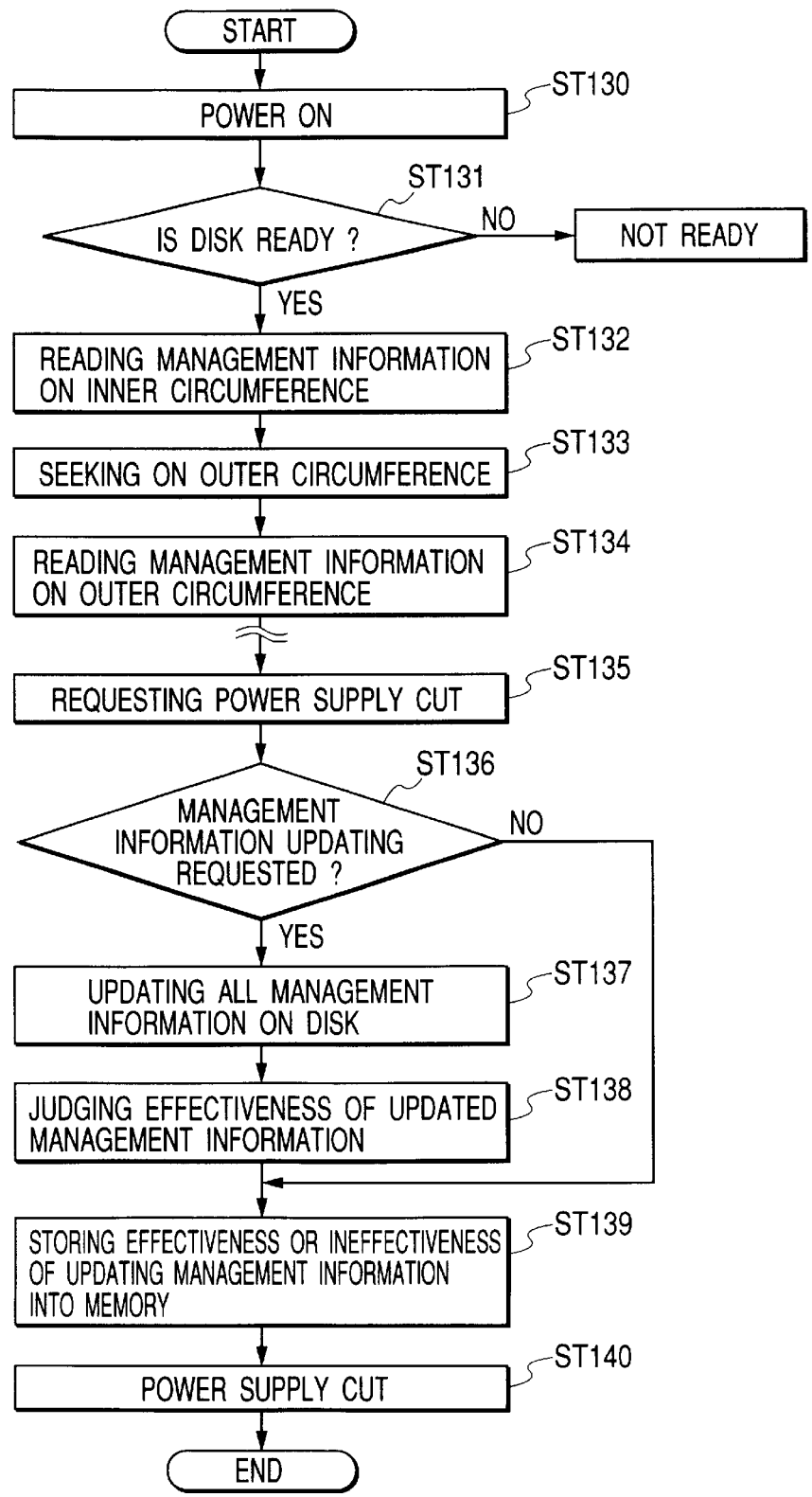
FIG. 6 shows still another example of procedure of control of reading management information by the device shown in FIG. 1.

FIG. 1 through FIG. 7 illustrate a first preferred embodiment of the invention. FIG. 1 shows an example of configuration of a recording/reproducing device integrated with a camera, as the first embodiment of the invention; FIG. 2, the data structure of management information on a disk as a recording medium for the device shown in FIG. 1; FIG. 3, an example of preliminary procedure until the start of recording or reproduction by the device shown in FIG. 1; FIG. 4, a flow chart showing an example of procedure of control of reading management information by the device shown in FIG. 1; FIG. 5, a flow chart showing another example of procedure of control of reading management information by the device shown in FIG. 1; FIG. 6, a flow chart showing still another example of procedure of control of reading management information by the device shown in FIG. 1; and FIG. 7, a flow chart unifying the procedures of FIG. 4 through FIG. 6.

In FIG. 1, reference numeral 1 denotes a microphone; 2, an audio input circuit; 3, a lens unit; 4, a CCD as an image pickup sensor; 5, a camera signal processing circuit; 6, a driver for driving the lens unit 3; 7, a compression/expansion processing circuit for compressing or expanding video signals and audio signals; 8, an audio output circuit; 9, an audio output terminal; 10, a liquid crystal display (LCD) as a display means; 11, a video output terminal; 12, a video display/output processing circuit; 13, a D-RAM; 14, a control microcomputer on the camera side; 15, a flash memory (F-ROM); 16, a built-in battery; 17, an insertion/ejection monitoring means for detecting or monitoring disk replacement; 18, an EEP-ROM as a non-volatile memory; 19, an interface (I/F) circuit; 20, the power switch of the device: 21, a charger circuit; 22, an external power supply input terminal; 23, a battery; 24, a DC-DC converter as a power supply circuit; 25, a disk as a recording medium; 26, a spindle motor for driving the revolution of the disk 25; 27, a pickup for recording or reproducing information signals onto or out of the disk 25; 28, a reproducing circuit; 29, a signal/control processing circuit for processing signals to be recorded or reproduced; 30, a D-RAM; 31, a feed motor for shifting the pickup 27 in substantially the radial direction of the disk 25; 32, a recording circuit; 33, an S-RAM; 34, an F-ROM as a flash memory; 35, an EEP-ROM as a non-volatile memory; 36, an actuator driver for driving the spindle motor 26, the feed motor 31 and an actuator (not shown) for controlling the focusing and tracking of an objective lens within the pickup 27; 37, a control microcomputer for a recording/reproducing unit; 38, a camera unit; 39, an output unit; 40, a control unit; and 41, a recording/reproducing unit. In this configuration, each memory is used to match its own characteristics. Thus, the D-RAMs 13 and 30 temporarily store data processed by the compression/expansion processing circuit 7 or by the control microcomputer 14. The S-RAM 33 temporarily stores working data for the control microcomputer among others the flash memory 15 stores programs and the like for operating the control microcomputer 14. The EEP-ROM 35 stores status information on mechanisms and the like. Both the flash memory and the EEP-ROM are capable of electrical recording and erasion in a non-volatile way. The flash memory is used for large capacity storage of information, and the EEP-ROM, for small capacity storage.

In the camera unit 38, is converted into electrical signals by the CCD 4 as an image pickup sensor via the lens unit 3 driven by the driver 6, and converted again into video signals by the camera signal processing circuit 5. On the other hand, audio information is converted into audio signals by the audio input circuit 2 via the microphone 1. In the output unit 39, the video signals and the audio signals are converted into compressed digital video/audio signals by the compression/expansion processing circuit 7. The compression system that can be used include the MPEG system for moving pictures and the JPEG system for still pictures. The audio signals from the compression/expansion processing circuit 7 are supplied to the audio output terminal 9 via the audio output circuit 8. The video signals are displayed on the LCD 10 as a display means via the video display/output processing circuit 12, and supplied from the video output terminal 11.

The control unit 40 is actuated by the supply of required voltages and currents to the individual means as the power switch 30 is turned on. The control microcomputer 14 controls the lens unit 3 via the driver 6 and captures on the CCD 4 as an image pickup sensor. The control microcomputer 14 effects control so as to compress pictures, moving or still, into digital signals with the compression/expansion processing circuit 7 and temporarily store them into the D-RAM 13. These signals are sent to the signal/control processing circuit 29 of the recording/reproducing unit 41 via the interface circuit 19. The control microcomputer 14 also keeps track of the state of power supply by monitoring the charger circuit 21 and processes power supply to the camera unit 38 by controlling the switch circuit 20 and otherwise. The built-in battery 16 is used as the power source for holding backup information including dates and for monitoring by the insertion/ejection monitoring means 17. The insertion/ejection monitoring means 17 is a means for detecting or monitoring replacement of the disk 25, and its possible configurations in specific terms include, for instance, arrangement a switch for detecting the presence or absence of a disk in the insertion receptacle. The detection switch may be so configured as to supply an electrical signal as the detection signal when power is supplied from a battery or some other source or as to detect with an electrical sensor the state of mechanical elements having a memory function when main power is supplied and to convey the information to the control means. The latter configuration dispenses with power supply from a battery.

The recording/reproducing unit 41 converts pictures, moving or still, entered from the interface circuit 19 into a recording format matching the disk 25 with the signal/control processing circuit 29 and the D-RAM 30, and records them on the disk 25 via the recording circuit 32 and the pickup 27. The relative positions of the disk 25 and the pickup 27 are determined by operating the pickup 27 for reproduction on a time division basis, detecting pre-written positional information from the disk 25 via the reproducing circuit 28, and processing it with the signal/control processing circuit 29 and the control microcomputer 37, and the spindle motor 26, the feed motor 31 and the actuator (not shown) provided within the pickup 27 are driven via the actuator driver 36. The S-RAM 33 and the flash memory 34 store operational data of the control microcomputer 37 temporarily, programs and the like. The non-volatile memory 35 stores operational data and the like.

While the foregoing description referred to operations at the time of recording information signals, operations approximately reverse to the foregoing are performed at the time of reproduction. Thus, information is detected from the disk 25 via the pickup 27 and the reproducing circuit 28, a recording format matching the disk 25 is demodulated by the signal/control processing circuit 29 and the control microcomputer 37 and is returned to the compression/expansion processing circuit 7 via the interface circuit 19, where the compressed video signals and audio signals are expanded, and the information is supplied to the display means 10, the audio output terminal 9 and the video output terminal 11 via the video display/output processing circuit 12 and the audio output circuit 8. Further, the device embodying the invention in this mode has the external power supply input terminal 22 as a power supply unit so that power supply can be received from outside. Also, the charger circuit 21 can be driven by an external power source via the external power supply input terminal 22 to charge the battery 23. When power is supplied from outside, the external power is converted into required voltages by the power supply circuit 24 and fed to different blocks. When no external power source is connected, power from the battery 23 is fed to different blocks via the power supply circuit 24. The disk 25 may be, for instance, a DVD-ROM for read-only use, a DVD-R as a write once type disk, and a DVD-RW or a DVD-RAM where rewriting is required.

FIG. 2 illustrates the data structure of management information on a disk as a recording medium for use with the device shown in FIG. 1. In this example, defect management information and file management information as sets of management information are recorded on a distributed basis in the inner circumferential area and the outer circumferential area of the disk. In each area are recorded defect management information and file management information of the same contents. For instance, in the case of a DVD-RAM disk, the inner circumferential side has two defect management information recording areas and one file management information recording area, and the outer circumferential side also has two defect management information recording areas and one file management information recording area. The sets of defect management information recorded in a total of four defect management information recording areas are of the same contents as each other, and the sets of file management information recorded in the total of two file management information recording areas are also of the same contents as each other. This distributed placement (in a plurality of areas) of sets of management information respectively of the same contents serves to enhance the reliability of data reproduction, and to make recording and reproduction less susceptible to the effects of fingerprints, dust and the like. When signals are to be recorded onto or reproduced out of a disk having such a configuration, in advance of the recording or reproducing operation, it is necessary to read the defect management information (first management information) in the aforementioned four positions (four recording areas) in the disk. The reading of the defect management information is performed to ready the disk device for using the disk. In the following description, the state of the disk device readied for using the disk will be referred to as the ready state. The term "ready" in FIG. 3, FIG. 4, FIG. 5 and FIG. 7 refers to this state. In a usual system, after it becomes ready, when a file system is to be read in at an instruction from a superior system, the sets of file management information in two positions in the disk (two recording areas) (second management information) are read in.

FIG. 3 shows an example of preparatory procedure until the start of recording or reproduction by the device shown in FIG. 1.

Referring to FIG. 3, (1) at step ST50 power supply to the device is turned on with the operation switch 20; (2) at step ST51 it is judged whether or not a disk is inserted in the disk; and (3) if a disk is inserted, at step ST52 the spindle motor 26 is turned. (4) After the revolving speed of the spindle motor has reached a prescribed level, at step ST53 offsets of the pickup 27, the actuator driver 36 and so forth are adjusted. (5) After that, at step ST54 the laser on the pickup 27 is caused to emit a beam. (6) At step ST55 the control is led into the focusing direction to focus the laser beam onto the recording face of the disk to form a minute spot. (7) Then at step ST56 the light spot is controlled in the radial direction of the disk to lead into tracking control for positioning on a track on the disk. (8) After performing gain adjustment for the focusing and tracking controls at step ST57, (9) the first management information (DMA) in two positions of the inner circumference is read at step ST58. (10) At step ST59 a recording test is conducted on the inner circumference, (11) at step ST60 seeking is done on the outer circumference, and (12) at step ST61 a recording test is conducted on the outer circumference. Then (13) at step ST62 the first management information in two positions of the outer circumference is read in.

In the preparatory sequence (1) through (13) described above, the result of reproduction is highly relative, but a longer time is taken until the start of reproduction because all the sets of defect management information (the first management information) in the inner circumferential area and the outer circumferential area is reproduced. Therefore, an improvement to shorten the required time is conceivable by eliminating duplications in the process of reading the first management information if high reliability is already proven.

FIG. 4 is a flow chart showing an example of procedure of control of reading management information by the device shown in FIG. 1.

Referring to FIG. 4, (1) at step ST70 the first power supply to the disk device is turned on with the operation switch 20; (2) at step ST71 it is judged whether or not there is a disk in the disk device and, if the finding of the judgment indicates the presence of a disk, (3) the processing from step ST52 through step ST62 in FIG. 3 is carried out (step ST72 through step ST74). In the following description, the management information reading operation to read in all the first management information will be referred to as the first management information reading mode. (4) After that, if at step ST75 there is a request to cut off power supply, (5) at step ST76 the effectiveness of the first management information is judged and information on the finding of the judgment is stored into, for instance, a memory in the control microcomputer 14 or the non-volatile memory 35 to which power is supplied from the built-in battery 16, (6) the power supply being cut off at step ST77. The effectiveness of the first management information here is judged in such a way that, for instance, if the sets of information from all the areas multiply recorded, read in the first management information reading mode, are found identical, the first management information is judged to be effective, but if any is found not identical with others, it is judged to be ineffective. (7) Until the power source of the disk device is again turned on with the operation switch 20 at step ST78, the control microcomputer 14 receiving power supply from the built-in battery 16 detects any insertion or ejection of the disk 25 with the insertion/ejection monitoring means 17. If the insertion/ ejection monitoring means 17 detects insertion or ejection of the disk 25, information that there has been injection or ejection is stored into the EEP-ROM 35, which is a non-volatile memory. (8) After that, at step ST78, power supply to the disk device is again turned on with the operation switch 20; (9) the control microcomputer 14 checks pertinent information in the non-volatile memory 35 at step ST79, and detects or monitors insertion or ejection of the disk after the power supply cut-off at step ST77 until the second turning-on of power supply at step ST78; (10) if the disk is neither inserted or ejected and at step ST80 the first management information stored in the memory within the control microcomputer 14 or the non-volatile memory 35 is judged to be effective, the state of the disk inserted in the disk device is judged to be unchanged from before, (11) and accordingly, after the first management information only in two recording areas on the inner or outer circumference side is read in at step ST81, the device is placed in a ready state. The management information reading mode in which a smaller number of sets of the first management information than in the first management information reading mode will hereinafter be referred to as the second management information reading mode. (12) If disk insertion or ejection is detected at step ST79 and disk insertion is detected at step ST82, or the first management information is judged to be ineffective at step ST80, (13) the first management information in two recording areas on the inner circumference of the disk is read in at step ST83; (14) seeking is performed toward the outer circumference at step ST84; and (15) the first management information in two recording areas on the outer circumference is read at step ST85. The operation to read the management information in this case is in the first management information reading mode. In the procedure described above, the management information is invalidated at the final stage of the action to eject the disk from the device to validate the judgment at step ST79. Although the foregoing description referred to a case in which, when in the second management information reading mode, the first management information in two recording areas on the inner circumference of the disk is supposed to be read, the first management information in only one recording area may as well be read. If the number of areas is one instead of two, the processing time can be further shortened. While the effectiveness is judged by the insertion or ejection of the disk (step ST79) and the first management information (step ST80) in the procedure charted in FIG. 4, it can be judged according to one of the two measures. Thus, since the disk insertion/ejection mechanism cannot be manipulated without a tool in a state in which the operation switch 20 is turned off, usually the absence of disk insertion/ejection is assumed, and the effectiveness is judged on the basis of the first management information alone. If it is found effective, processing can be done in the second management information reading mode, or the effectiveness is judged by the presence or absence of disk insertion/ejection and, if it is found effective, processing can be done in the second management information reading mode.

FIG. 5 is a flow chart showing another example of procedure of control of reading management information by the device shown in FIG. 1. This procedure is used for judging the effectiveness of both the first management information and the second management information.

Referring to FIG. 5, (1) at step ST100 power supply to the disk device is turned on with the operation switch 20; (2) whether or not a disk is inserted in the device is judged at step ST101; (3) if a disk is inserted, the first management information on the inner circumference of the disk is read at step ST102; (4) after that at step ST103 seeking is performed toward the outer circumference; and (5) the first management information (DMA) on the outer circumference is read at step ST10. (6) At step ST105, seeking is performed toward the inner circumference; (7) at step ST106 the second management information on the inner circumference is read: (8) after that at step ST107 seeking is performed toward the outer circumference; and (9) at step ST108 the second management information on the outer circumference is read. This management information reading operation is in the first management information reading mode in which all the management information is read. (10) After that, if at step ST109 there is a request to cut off power supply, (11) at step ST110 the effectiveness of the management information is judged, and that information is stored into, for instance, the memory within the control microcomputer 14 to which power is supplied by the built-in battery 16 or the non-volatile memory 35. The effectiveness of the management information is judged in such a way that, for instance, if the sets of information from all the areas multiply recorded (four recording areas for the first management information and two recording areas for the second management information), read in the first management information reading mode, are found identical, the first management information is judged to be effective, but if any is found not identical with others, it is judged to be ineffective. (12) After that, power supply 8 is cut off at step ST111 and until the power source of the disk device is again turned on with the operation switch 20, the control microcomputer 14 receiving power supply from the built-in battery 16 detects any insertion or ejection of the disk 25 with the insertion/ejection monitoring means 17. (13) Then at step ST112 power supply to the disk device is again turned on with the operation switch 20 (the second turning-on of power supply). (14) After that at step ST113 it is checked whether or not the disk has been either inserted or ejected; (15) if the disk was neither inserted nor ejected after the power cut-off at step ST111 until the turning-on of power supply at step 112 and at step ST114 the first management information stored in the memory within the control microcomputer 14 or the non-volatile memory 35 is judged to be effective, the first management information in two recording areas on the inner circumference of the disk is read in at step ST115 because the state of the disk inserted in the disk device can be assumed to be unchanged from before. (16) If the judgment of the second management information at step ST116 indicates effectiveness of the second management information stored into the non-volatile memory 35 at step ST110, (17) the second management information only on the inner circumference is read in at step ST117, and the device is placed in a ready state. While in the procedure of FIG. 5 again the effectiveness is judged according to the insertion or ejection of the disk and the management information (step ST113, step ST114 and step ST116), it can be judged according to one of the two bases if the other is fixed. Thus, the effectiveness can be judged according to the management information alone, it being assumed that the disk is neither inserted nor ejected, and processing done in the second management information reading mode to start up the device in a shorter period of time, or alternatively it can be judged only according to the insertion or ejection of the disk, it being assumed that the management information is effective, and processing done the second management information reading mode to start up the device in a shorter period of time. (18) If the checkup at step ST113 reveals the insertion or ejection of the disk and that at step ST118 reveals insertion of the disk, or the effectiveness checkup of the first and second management information at step ST114 and step ST116 reveals ineffectiveness of either the first or the second management information, (19) at step ST119 the first management information in two recording areas on the inner circumference of the disk is read in; (20) after that at step ST120 seeking is performed toward the outer circumference of the disk; and (21) at step ST121 the first management information in two recording areas on the outer circumference of the disk are read in. (22) At step ST122 seeking is performed toward the inner circumference of the disk; (23) after reading the second management information on the inner circumference of the disk at step ST123, (24) at step ST124 seeking is performed toward the outer circumference of the disk; and (25) at step ST125 the second management information on the outer circumference of the disk is read in. This operation to read the management information is done in the first management information reading mode.

FIG. 6 is a flow chart showing still another example of procedure of control of reading management information by the device shown in FIG. 1. This procedure is used when there is a request for updating of the management information.

Referring to FIG. 6, (1) at step ST130, the power switch 30 is turned on; (2) at step ST131 it is judged whether or not a disk is inserted in the device and if the presence of a disk is found, (3), the management information on the inner circumference of the disk is read in at step ST132. (4) At step ST133 seeking is done toward the outer circumference of the disk, and (5) at step ST134 the management information on the outer circumference of the disk is read in. (6) After that, if at step ST135 there is a request to cut off power supply and (7) step ST136 there is a request for updating of the first management information or the second management information, (8) at step ST137 all the sets of management information multiply recorded on the disk and for which updating is requested are updated. (9) At step ST138 it is judged whether or not the management information updated at step ST137 was correctly updated. This judgment about updating is made after reading all the sets of management information on the updated disk. If all the sets of management information that have been read are correct, the updated management information is judged to be effective, but if any one set of management information incorrect, the updated information is considered ineffective. (10) After storing the effectiveness or ineffectiveness of the management information updating is stored into the non-volatile memory 35 or the like at step ST139, (11) power supply to the device is cut off at step ST140. Incidentally, updating is requested independently of any request to cut off power supply.

To add, "power ON" at step ST70 in FIG. 4, step ST100 in FIG. 5 and step ST130 in FIG. 6 presupposes that a disk has been inserted.

Figure 7:
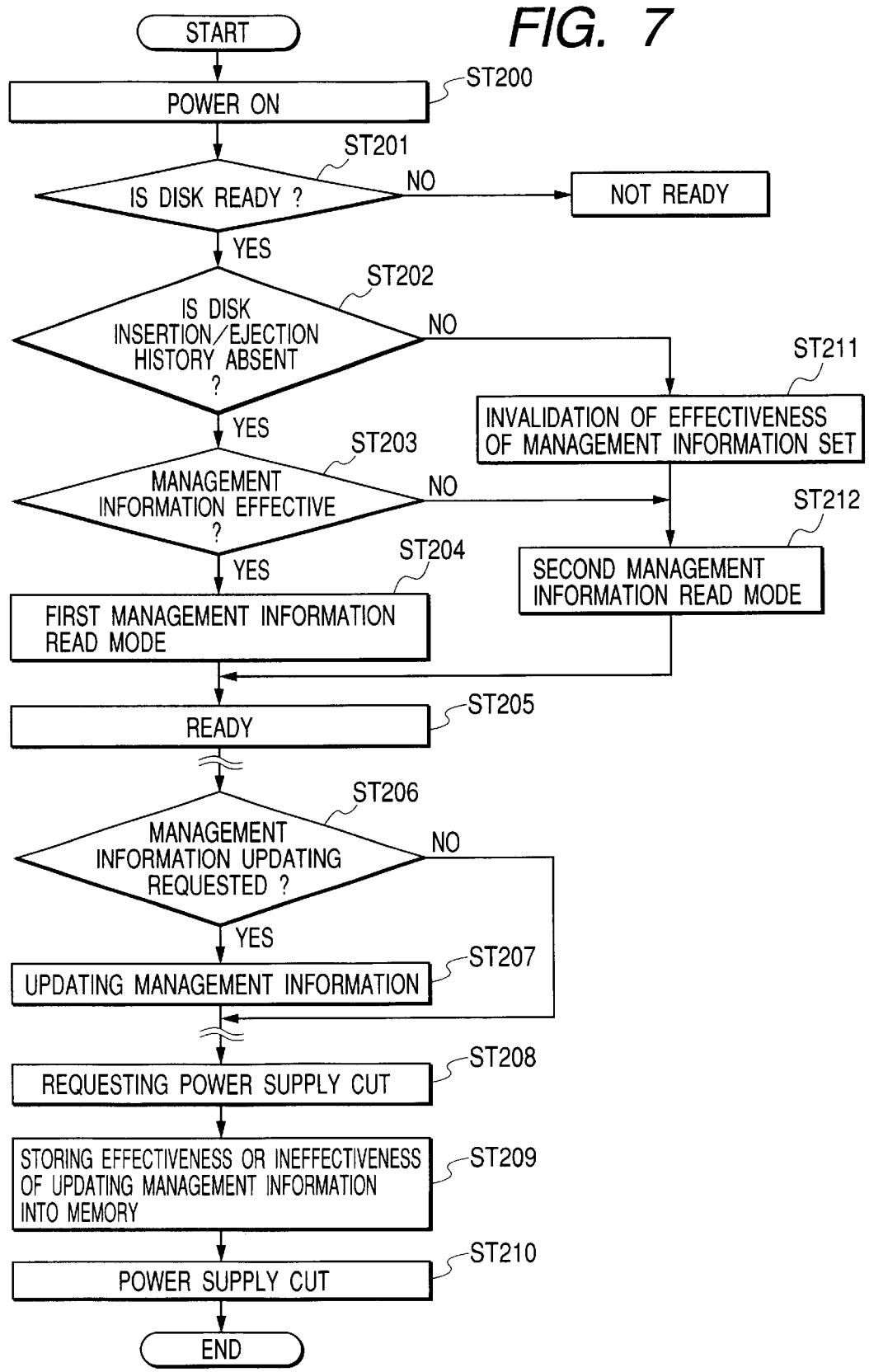
FIG. 7 is a flow chart unifying the procedures of FIG. 4 through FIG. 6.

FIG. 7 is a flow chart unifying the procedures of FIG. 4 through FIG. 6, illustrating a procedure of control of reading management information with emphasis on distinction between the first turning-on of power supply and the second turning-on of power supply.

Referring to FIG. 7, (1) at step ST200 power supply is turned on; (2) at step ST201 the presence or absence of a disk is judged; (3) at step ST202 the insertion/ejection of the disk is checked; (4) at step ST203 the effectiveness of management information is checked; and (5) if the management information is found effective, the first management information reading mode is selected at step ST204, or if (6)the management information is found ineffective, the second management information reading mode is selected at step ST212. (7) After the devices becomes ready at step ST205; (8) at step ST206 it is judged whether or not there is a request for updating the management information and (9) if there is a request, the management information is updated at step ST207 (equivalent to step ST136 through step ST138 in FIG. 6). (10) If at step ST208 there is a request to cut off power supply, the effectiveness of management information is stored into a memory at step ST209, and (11) power supply is cut off at step ST210. The procedure described above makes possible proper selection of the management information reading mode at the first and second occasions of power turning-on. Seeking and other operations in the first management information reading mode and the second management information reading mode are the same as in the procedures charted in FIG. 4 through FIG. 6.

Figure 8:
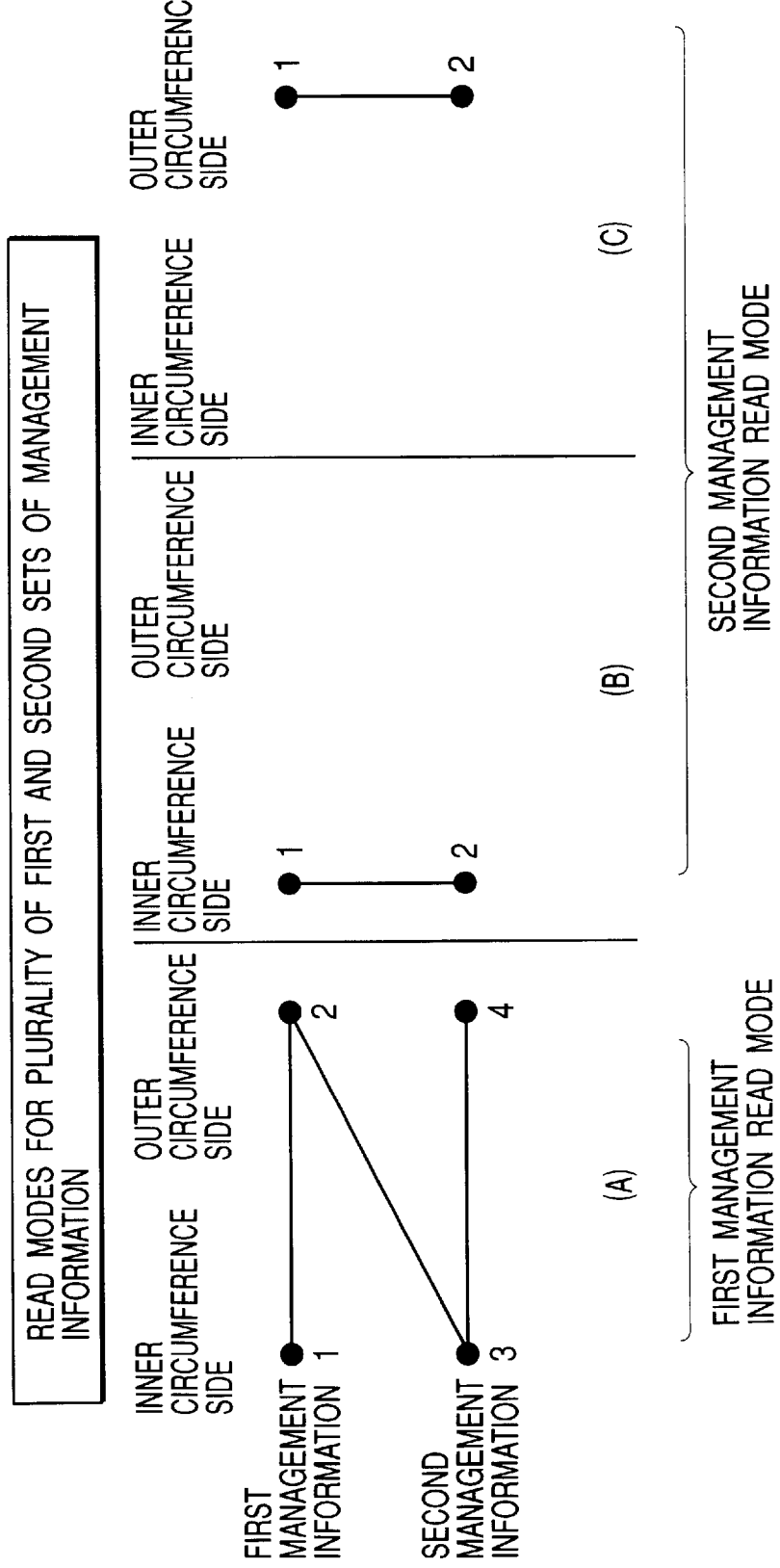
FIG. 8 shows an example of read mode for first management information and an example of read mode for second management information.

FIG. 8 shows an example of read mode for the first management information and an example of read mode for the second management information. For instance, in a DVD-RAM disk the first management information is defect management information DMA) and the second management information is file management information (UDF).

Referring to FIG. 8, (A) is the first management information reading mode in which all of the first management information and the second management information are read sequentially; (B) is the second management information reading mode in which the first and second management information only on the inner circumference is read, and (C), the second management information reading mode in which the first and second management information only on the outer circumference is read. Numerals in the diagram denote the sequence of reading. In the second management information reading mode in which only the inner circumference side or the outer circumference side is read, the frequency of seeking toward the outer circumference of the disk can be lower than that in the first management information reading mode.

The first preferred embodiment of the present invention described above permits selection of the management information reading mode according to the judgment on the effectiveness of the management information and the detection of disk insertion/ejection. Even when the main power supply is cut off, the effectiveness of the management information is maintained if the disk is neither inserted nor ejected, and therefore, when the power supply is resumed, the length of time taken to start up the disk device can be shortened by selecting the second reading mode in which only part of the management information is read, thereby making possible quicker start of recording or reproducing operation.

Figure 9:
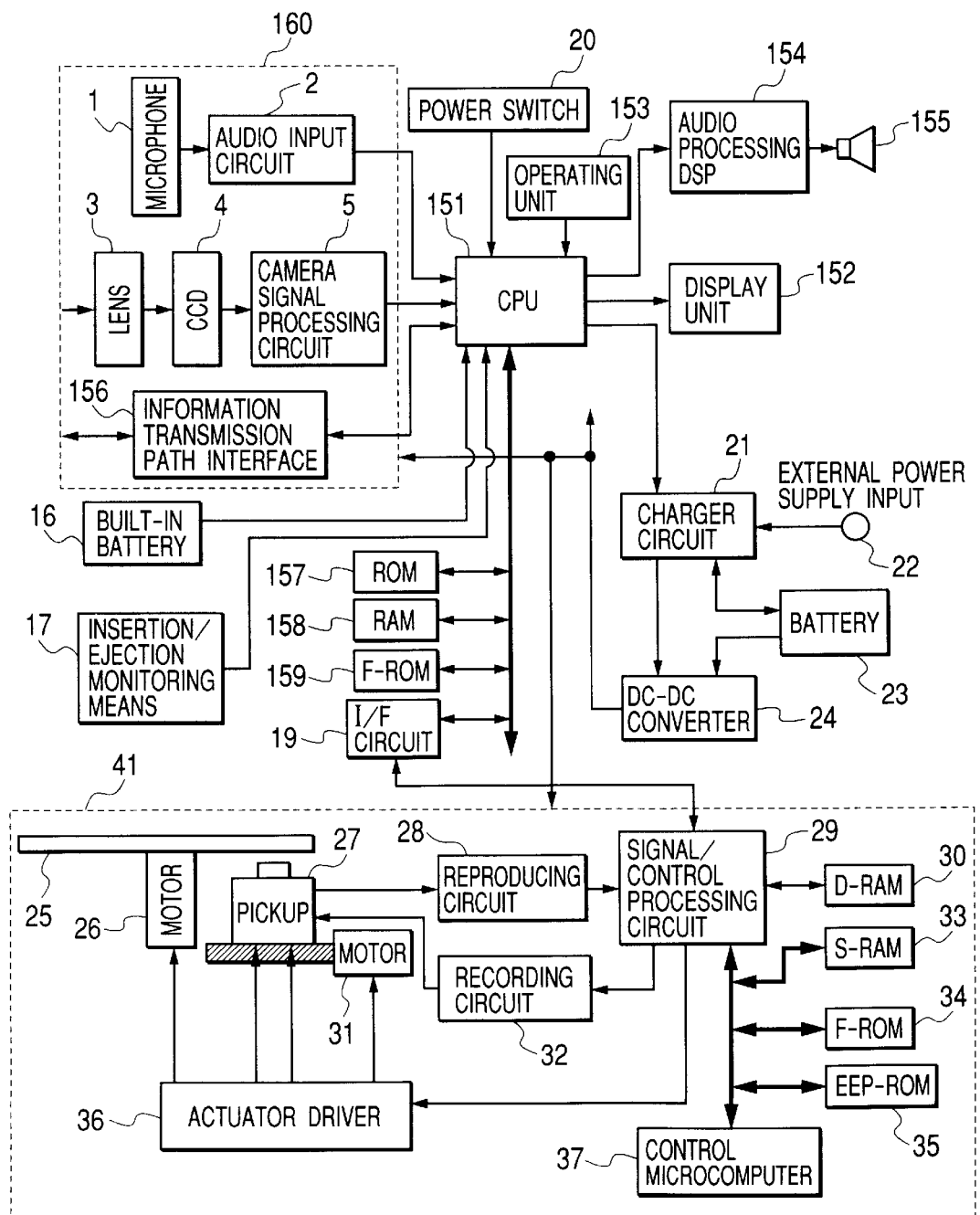
FIG. 9 illustrates a second preferred embodiment of the invention.

FIG. 9 illustrates a mobile information processing device, which is a second preferred embodiment of the invention.

Referring to FIG. 9, reference numeral 151 denotes a CPU; 152, a display unit; 153, an operating unit; 154, a digital signal processor (DSP) for audio processing; 155, a loudspeaker: 156, information transmission path interface; 157, a ROM; 158, a RAM; 159, an F-ROM as a flash memory; and 160, an input/output unit. Other functional parts which are either the same as or similar to their counterparts in FIG. 1 are denoted by respectively the same reference signs. This second embodiment is a mobile information processing device having a recording/reproducing unit 41. A disk 25 that can be inserted or ejected is used as the recording/reproducing unit 41 of the mobile information processing device, and the input/output unit 160 has a configuration permitting real-time recording. The input/output unit 160 receives audio signals through the microphone 1 and the audio input circuit 2 and video signals though the lens unit 3, the CCD 4 as an image pickup sensor, and the camera signal processing circuit 5. Although through its information transmission path interface 156, the device inputs and outputs multimedia information including images, voices and data to and from external apparatuses and networks. Information accepted through the input/output unit 160 is processed by the CPU 151, and is temporarily stored into the RAM 158 serving as a buffer memory. These pieces of information, when they have reached a prescribed quantity, is recorded by the recording/reproducing unit 41 via the interface circuit 19. The operation of the device is controlled by the operations of the operating unit 153. The display unit 152 displays the state of the device. Other aspects of the configuration, effects and operations of the constituent parts are basically similar to their respective counterparts in the first embodiment shown in FIG. 1. Especially regarding the reading of management information in advance of a recording or reproducing operation, where this second embodiment uses a disk similar to that in the first embodiment as a disk to serve as the recording medium, control on the reading of the management information is performed in the procedures charted in FIG. 2 through FIG. 8 to ready the device for a recording or reproducing operation.

The second embodiment of the invention, like the first embodiment, permits selection of the management information reading mode on the basis of the judgment of the effectiveness of the management information and the detection of disk insertion/ejection. When the second reading mode is selected, the length of time taken to start up the disk device can be further shortened. Furthermore, a high level of convenience as a mobile information processing device can be achieved.

According to the present invention, it is possible to shorten the length of time taken to start up the disk device by reducing the time required for reading management information, thereby making possible quicker start of recording or reproducing operation.

The invention can be implemented in other manners of embodiment without deviating from its spirit or principal features. Therefore, the embodiments are no more than mere examples of implementation of the invention, but should not be construed in a restrictive way. The scope of the invention is defined by the appended claims. Further, all modifications and alterations belonging to the range of equivalence to those claims fall within the scope of the present invention.

What is claimed is:

1. A disk device for recording and/or reproducing signals onto or out of a disk on which management information of the same contents is multiply recorded over a plurality of areas, provided with:
   a judging means for judging the effectiveness of said management information in recording or reproducing said signals;
   a memory means capable of storing the finding of the judgment even when power supply is off; and
   a control means for selecting the mode of reading said management information from some of a plurality of recording areas of the disk on the basis of information on the finding of the judgment,
   wherein the management information is read out of some of the recording areas of the disk in advance of a recording or reproducing operation if said stored information on the finding of the judgment indicates effectiveness for the inserted disk.

2. The disk device according to claim 1, wherein said plurality of areas in which management information is recorded are divided between the inner circumferential part and the outer circumferential part of said disk.

3. The disk device according to claim 1, wherein said recorded or reproduced signals are information signals from a camera image pickup device.

4. A disk device for recording and/or reproducing signals onto or out of a disk on which management information of the same contents is multiply recorded over a plurality of areas, comprising:
   a detecting means for detecting whether or not said disk is fitted;
   a judging means for judging the effectiveness of said management information in said recording or reproduction;
   a memory means capable of storing the finding of the judgment even when power supply is off; and
   a control means for selecting the mode of reading said management information from the disk on the basis of information on the finding of the judgment,
   wherein the management information is read out of some of a plurality of recording areas of the disk in advance of a recording or reproducing operation if the fitting of said disk is detected and the stored information on the finding of the judgment indicates effectiveness for the inserted disk when power supply is turned on.

5. The disk device according to claim 4, wherein said plurality of areas in which management information is recorded are four areas, and control is so effected that management information be read from one of these areas.

6. A disk device for recording and/or reproducing signals onto or out of a disk on which management information of the same contents is multiply recorded over a plurality of areas, comprising:

an insertion/ejection detecting means for detecting insertion or ejection of said disk;

a memory means capable of storing the result of the detection of insertion or ejection even when power supply is off; and a control means for selecting the mode of reading said management information on the basis of the stored information on the result of the detection of insertion or ejection, wherein the management information is read out of some of the recording areas of the disk in advance of a recording or reproducing operation if neither insertion nor ejection of said disk is detected.

7. The disk device according to claim 6, wherein said plurality of areas in which management information is recorded are divided between the inner circumferential part and the outer circumferential part of said disk.

8. A disk device for recording and/or reproducing signals onto or out of a disk on which management information of the same contents is multiply recorded over a plurality of areas, comprising:

a detecting means for detecting whether or not said disk is fitted;

a judging means for judging the effectiveness of said management information in said recording or reproduction;

an insertion/ejection detecting means for detecting insertion or ejection of said disk;

a memory means capable of storing the result of the detection of insertion or ejection and said finding of the judgment even when power supply is off; and a control means for selecting the mode of reading said management information on the basis of the stored information on the result of the detection of insertion or ejection and said finding of the judgment, wherein the management information is read out of some of the recording areas of the disk in advance of a recording or reproducing operation if the fitting of said disk is detected, said stored finding of the judgment indicates effectiveness for the inserted disk and neither insertion nor ejection of said disk is detected when power supply is turned on.

9. The disk device according to claim 8, wherein said detecting means, said judging means and said control means operate on a first power source, said insertion/ejection detecting means and said memory means operate on a second power source and, when said first power source is turned on, selection regarding the mode of reading said management information is performed.

10. The disk device according to claim 8, wherein said management information consists of a first set of management information for managing the state of said disk itself and a second set of management information for managing data information recorded on the disk for eventual reproduction, and the first and second sets of management information are recorded on a distributed basis in the inner circumferential area and the outer circumferential area of said disk, and control is so effected that the first and second sets of management information be read out of either of these areas.

11. A disk device for recording and/or reproducing signals onto or out of a disk on which management information of the same contents is multiply recorded over a plurality of areas, comprising:

a detecting means for detecting whether or not said disk is fitted;

a judging means for judging the effectiveness of said management information in said recording or reproduction with respect to management information recorded over a plurality of recording areas of the disk;

a memory means capable of storing the finding of the judgment even when power supply is off; and a control means for selecting the mode of reading said management information from the disk on the basis of the stored information on the finding of the judgment, wherein if the fitting of said disk is detected and the stored information on the finding of the judgment indicates effectiveness for the inserted disk when power supply is turned on, the management information is read out of that area indicated to be effective and a recording or reproducing operation is started.

12. A disk device for recording and/or reproducing signals onto or out of a disk on which management information of the same contents is multiply recorded over a plurality of areas, comprising:

a detecting means, operating on a first power source, for detecting whether or not said disk is fitted;

a judging means, operating on the first power source, for judging the effectiveness of said management information in said recording or reproduction;

a memory means, operating on a second power source, for storing the finding of the judgment; and a control means, operating on the first power source, for selecting the mode of reading said management information on the basis of said stored information on the finding of the judgment, wherein when said first power source is turned on, if the fitting of said disk is detected and said stored information on the finding of the judgment indicates effectiveness for the inserted disk, effective management information is read out of either a first area or a second area of the disk or, if it indicates ineffectiveness, the management information is read out of both the first area and the second area.

13. A disk device for recording and/or reproducing signals onto or out of a disk on which management information of the same contents is multiply recorded over a plurality of areas, comprising:

a detecting means for detecting whether or not said disk is fitted;

an insertion/ejection detecting means for detecting insertion or ejection of said disk;

a memory means capable of storing the result of the detection of insertion or ejection even when power supply is off; and a control means for selecting the mode of reading said management information on the basis of the stored information on the result of the detection of insertion or ejection, wherein effective management information is read out of some of the plurality of recording areas of the disk if the fitting of said disk is detected and neither insertion nor ejection of said disk is detected when power supply is turned on.

14. The disk device according to claim 13, wherein said management information consists of a first set of management information for managing the state of said disk itself and a second set of management information for managing data information recorded on the disk for eventual reproduction, and the first and second sets of management information are recorded on a distributed basis in the inner circumferential area and the outer circumferential area of said disk, and control is so effected that the first and second sets of management information be read from either of these areas.

15. A disk device for recording and/or reproducing signals onto or out of a disk on which management information of the same contents is multiply recorded over a plurality of areas, comprising:
   a recording means for recording said management information in first and second areas of said disk;
   a judging means for judging the effectiveness of said management information;
   a memory means capable of storing the finding of the judgment even when power supply is off; and
   a control means for selecting the mode of reading said management information from the disk on the basis of the stored information on the finding of the judgment,
   wherein the management information is read out of either of said first and second areas in advance of recording or reproducing said signals if said stored information on the finding of the judgment indicates effectiveness for the inserted disk or, if it indicates ineffectiveness of said management information, the management information is read out of both the first and the second areas.

16. An information processing terminal device for processing received signals comprising:
   an interface for information transmission;
   an information processing means for processing information;
   a disk device for recording and/or reproducing the processed information onto or out of a disk on which management information of the same contents is multiply recorded over a plurality of areas; and
   a display means,
   said disk device further comprising:
      a judging means for judging the effectiveness of said management information in recording or reproducing said signals;
      a memory means capable of storing the result of the judgment even when power supply is off; and
      a control means for reading management information out of some of the recording areas of the disk in advance of said recording or reproducing operation if said stored information on the finding of the judgment indicates effectiveness for the inserted disk.

17. An information processing terminal device for processing received signals comprising:
   an interface for information transmission;
   an information processing means for processing information;
   a disk device for recording and/or reproducing the processed information onto or out of a disk on which management information of the same contents is multiply recorded over a plurality of areas; and
   a display means,
   said disk device further comprising:
      an insertion/ejection detecting means for detecting insertion or ejection of said disk;
      a memory means capable of storing the result of the detection of insertion or ejection even when power supply is off, and
      a control means for reading management information out of some of the recording areas of the disk if neither insertion nor ejection of said disk is detected.

18. A method of controlling the reading of management information in a disk device for recording and/or reproducing the processed information onto or out of a disk on which management information of the same contents is multiply recorded over a plurality of areas, comprising the steps of:
   reading said management information in advance of recording or reproducing said signals;
   judging the effectiveness of the read management information;
   storing the finding of the judgment into a memory means capable of storing even when power supply is off;
   determining whether or not the stored information of the finding of the judgment indicates effectiveness for the inserted disk; and
   reading management information out of some of the recording areas of the disk if the stored information on the result of the determination indicates effectiveness for the inserted disk.

19. A method of controlling the reading of management information in a disk device for recording and/or reproducing the processed information onto or out of a disk on which management information of the same contents is multiply recorded over a plurality of areas, comprising the steps of:
   detecting insertion or ejection of said disk;
   storing the result of detection into a memory means capable of storing even when power supply is off; and
   reading effective management information out of some of the recording areas of the disk if the stored information on the result of the detection of insertion or ejection indicates neither insertion nor ejection of said disk.

20. A disk device for recording and/or reproducing signals onto or out of a disk on which management information of the same contents is multiply recorded over a plurality of areas, provided with:
   a judging circuit which judges the effectiveness of said management information in recording or reproducing said signals;
   a memory capable of storing the finding of the judgment even when power supply is off; and
   a control circuit which selects the mode of reading said management information from some of a plurality of recording areas of the disk on the basis of information on the finding of the judgment,
   wherein the management information is read out of some of the recording areas of the disk in advance of a recording or reproducing operation if said stored information on the finding of the judgment indicates effectiveness for the inserted disk.

21. A disk device for recording and/or reproducing signals onto or out of a disk on which management information of the same contents is multiply recorded over a plurality of areas, comprising:
   a detecting circuit which detects whether or not said disk is fitted;
   a judging circuit which judges the effectiveness of said management information in said recording or reproduction;

a memory capable of storing the finding of the judgment even when power supply is off; and a control circuit which selects the mode of reading said management information from the disk on the basis of information on the finding of the judgment, wherein the management information is read out of some of a plurality of recording areas of the disk in advance of a recording or reproducing operation if the fitting of said disk is detected and the stored information on the finding of the judgment indicates effectiveness for the inserted disk when power supply is turned on.

22. A disk device for recording and/or reproducing signals onto or out of a disk on which management information of the same contents is multiply recorded over a plurality of areas, comprising:

an insertion/ejection detecting circuit which detects insertion or ejection of said disk;

a memory capable of storing the result of the detection of insertion or ejection even when power supply is off; and a control circuit which selects the mode of reading said management information on the basis of the stored information on the result of the detection of insertion or ejection, wherein the management information is read out of some of the recording areas of the disk in advance of a recording or reproducing operation if neither insertion nor ejection of said disk is detected.

* * * * *